United States Patent [19]

Atkins

[11] Patent Number: 4,477,121
[45] Date of Patent: Oct. 16, 1984

[54] QUICK RELEASE WHEEL

[76] Inventor: Michael T. Atkins, 1820 S. 132nd E. Pl., Tulsa, Okla. 74108

[21] Appl. No.: 429,314

[22] Filed: Sep. 30, 1982

[51] Int. Cl.³ ............................................. B60B 27/02
[52] U.S. Cl. ..................................... 301/112; 301/122
[58] Field of Search .............. 301/111, 121, 112, 115, 301/119, 122, 113, 114, 117, 118; 285/277, 316

[56] References Cited

U.S. PATENT DOCUMENTS

| | | | |
|---|---|---|---|
| 1,379,860 | 5/1921 | Genton | 301/111 |
| 1,462,255 | 7/1923 | Austin et al. | 301/113 X |
| 1,515,940 | 11/1924 | Edwards | 301/113 X |
| 3,039,794 | 6/1962 | Cenzo | 285/316 X |
| 3,315,532 | 4/1967 | Carnesecca, Jr. et al. | 285/277 X |
| 3,346,276 | 10/1967 | Snyder, Jr. | 285/277 X |
| 3,351,363 | 11/1967 | Downey et al. | 285/316 X |
| 3,727,952 | 4/1973 | Richardson | 285/316 X |
| 3,761,117 | 9/1973 | Shendure | 285/277 |
| 4,148,459 | 4/1979 | Martinez | 285/277 X |
| 4,225,191 | 9/1980 | Knoski | 301/63 PW X |
| 4,231,670 | 11/1980 | Knoski | 301/121 X |
| 4,299,051 | 11/1981 | Pauley et al. | 301/118 X |
| 4,354,711 | 10/1982 | Main | 301/114 X |
| 4,376,554 | 3/1983 | Schumacher | 301/114 X |
| 4,392,690 | 7/1983 | Anderson | 301/121 |

FOREIGN PATENT DOCUMENTS 1045244 11/1958 Fed. Rep. of Germany ...... 301/121

Primary Examiner—Robert B. Reeves
Assistant Examiner—Russell D. Stormer
Attorney, Agent, or Firm—William S. Dorman

[57] ABSTRACT

A quick release coupling for a wheel and axle comprising an axle having an outer end for receiving a wheel thereon, a circumferential ball receiving groove adjacent the end of the axle, a wheel having a hub portion with a central opening therein for receiving the end of the axle, a bushing mounted on the hub surrounding the central opening for receiving the end of the axle, intermating splines on the axle and bushing for preventing relative rotational movement of the wheel and the axle, a plurality of circumferentially arranged and spaced ball receiving holes in the bushing overlying the ball receiving groove when the axle is in a locked position relative to the wheel, a plurality of balls received in the ball receiving holes, a locking sleeve slidably and axially mounted on the bushing, a first spring for urging the sleeve towards the wheel, a plunger centrally mounted within the bushing, a second spring for urging the plunger against the end of the axle, a stop for limiting the axial movement of the sleeve towards the wheel, the sleeve having an internal cylindrical surface overlying the balls in the locked position to hold the balls in the ball receiving groove, the sleeve being provided with an internal ball receiving recess of larger diameter than that of the flat cylindrical surface and located inwardly thereof towards the wheel, and handles on the sleeve for manually pulling the sleeve axially away from the wheel to permit the balls to drop into the ball receiving recess thereby permitting withdrawal of the wheel from the axle, the plunger, after the wheel has been withdrawn from the axle, moving towards the balls and retaining the balls in the ball receiving recess.

4 Claims, 7 Drawing Figures

QUICK RELEASE WHEEL

BACKGROUND OF THE INVENTION

1. Field of the Invention

The present invention relates to an improved quick release wheel. More particularly, the present invention relates to a quick release wheel wherein only one motion is required for the release of the wheel from the vehicle and without the use of lug nuts.

2. Prior Art

The present general method of fastening a wheel to a vehicle is with the use of lug nuts. United States Patents uncovered as a result of a preliminary search on the present invention revealed Hoover U.S. Pat. No. 991,991; Pfau U.S. Pat. No. 2,705,159; Miyamoto U.S. Pat. No. 4,005,735; Asberg U.S. Pat. No. 4,225,263; and Knoski U.S. Pat. No. 4,231,670. The latter patent shows a type of quick release wheel which does not employ lug nuts; however, as will hereinafter appear, the present invention discloses a quick release wheel which is less complicated, less expensive to manufacture and easier and quicker to operate.

SUMMARY OF THE INVENTION

The present invention includes a wheel comprised of a tire mounted on a rim. The rim is provided with a central hub which is adapted to receive an axle of a vehicle. The axle is provided with a groove which is adapted to lock against a plurality of balls mounted in the hub as will hereinafter appear.

The rim of the wheel connects with a flat central portion on which the hub is mounted. This flat portion, or web, is provided with a central opening which is in alignment with a central splined opening in a bushing. The bushing is attached to the web by means of a plurality of circumferentially spaced bolts which extend through suitable holes in the web and which are threadedly received in circumferentially spaced threaded holes in a flange portion of the bushing. In addition to the groove, the outer end of the axle is provided with splines which register with the splined opening in the bushing.

The bushing is provided with a plurality of circumferentially spaced radial openings in which are received a plurality of balls. The radially innermost ends of these ball openings are preferrably of lesser diameter than the diameter of the balls to prevent the balls from passing inwardly into the interior of the bushing. The balls are received in the groove of the axle. A sleeve is mounted on the bushing and cooperates with the bushing to hold the balls in the locked position of the wheel.

An end cap having a circumferential flange is threadedly received in an outer threaded end of the bushing. This same end of the bushing is provided with an outer surface of lesser diameter than the surface of the portion of the bushing in which the ball openings are located. The two surfaces referred to above connect through a shoulder. The sleeve is provided with an inwardly directed flange which rides over the reduced surface between the flange on the cap and the shoulder on the bushing. A helical or coiled spring is received in the annular space between the bushing and the sleeve and also between the two flanges. The spring, therefore, normally urges the sleeve towards the bushing.

A plunger having a chamfered edge at its left hand edge is mounted in the space between the left hand end of the cap (assuming that the cap is towards the right) and the right hand end of the axle. The right hand end of the plunger is provided with a circumferential flange which will come against a left hand stop located on the interior opening of the bushing in which the cap is received. A second spring is located between the plunger and the end cap to urge the plunger towards the left for a purpose which will hereinafter appear. The interior left hand portion of the sleeve is provided with a chamber which is defined by a right hand flat cylindrical portion which correctly overlies the balls in the locked position; this chamber is provided with a ball receiving recess to the left and of slightly larger diameter than the flat cylindrical portion. When the elements move towards the open position of the connection, the balls are urged into the recess by means of the plunger. The extreme left hand portion of the sleeve is provided with a radially inwardly directed lip which essentially keeps dirt from going into the space between the sleeve and the bushing. This lip can be curved at the inner edge or can be provided with spaced openings for purposes of assembly of the device. For the purposes of moving or operating the sleeve, four radials lugs or handles are provided.

Starting from the closed or locked position wherein the hub (and hence the wheel itself) is located on the axle (assuming the end of the axle is directed toward the right), if it were desired to remove the hub from the axle, one merely need pull towards the right on the handles; this will move the sleeve towards the right, compressing the larger helical spring. The flat cylindrical surface is no longer opposite the balls, but the balls are now opposite the recess in the sleeve; in fact, the lowermost balls can drop into this recess. At this point, continued pulling of the handles towards the right will cause the entire assembly including the bushing, the web, the rim, and the wheel to move further towards the right by moving the balls outwardly from the groove as the axle moves relatively towards the left with respect to the remaining assembly. When the wheel has been fully withdrawn from the axle, the plunger will move towards the left under the action of the smaller spring until the flange on the inside of the sleeve hits against the stop or shoulder. At this time, the balls will be in the ball recess.

Starting from a position where the wheel was off the axle, if it were desired to place the wheel on the axle, the latter is aligned with the openings in the hub and the wheel including the hub portion is moved towards the left until the right hand end of the axle comes against the left hand end of the plunger. Continued urging of the wheel towards the left will cause movement of the plunger towards the right with a consequent compression of the smaller spring. The upper balls will now drop into the upper portion of the groove. Under the influence of the larger spring, the sleeve will more towards the left until the inclined portion of the chamber which connects the ball receiving recess with the flat cylindrical portion engages the balls and urges them firmly into the groove, thus returning the elements to the locked position of the wheel.

DETAILED DESCRIPTION OF THE PREFERRED EMBODIMENTS

Figure 1:
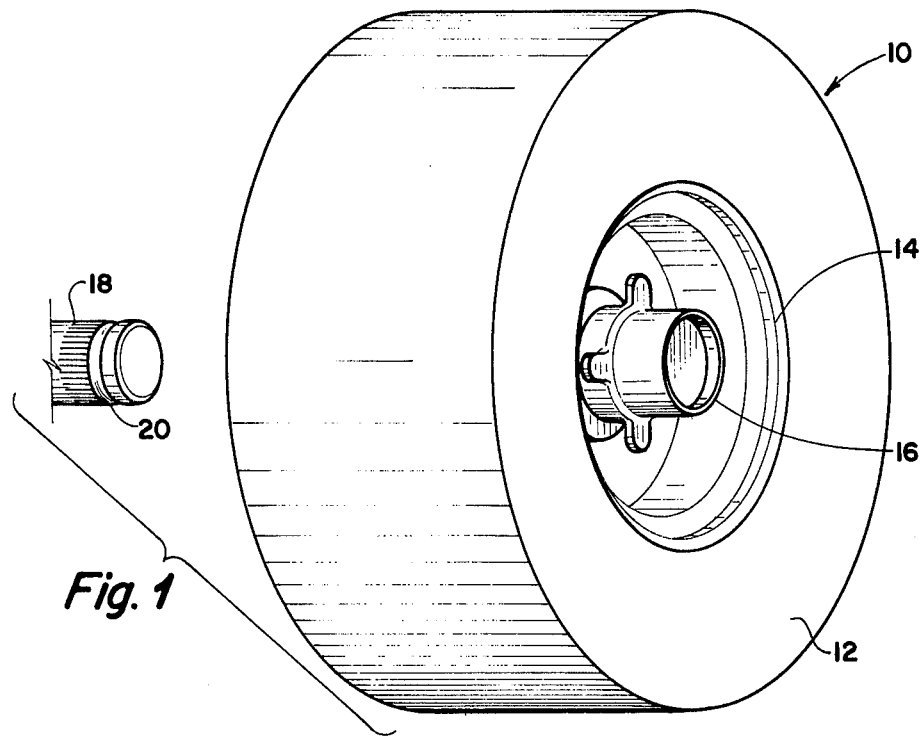
FIG. 1 is an exploded perspective view of a wheel embodying the present invention shown in spaced relation with respect to an axle to which the wheel is to be attached.

Referring to the drawings in detail, FIG. 1 shows a wheel 10 comprised of a tire 12 mounted on a rim 14. The rim 14 is provided with a central hub 16 which is adapted to receive an axle 18 of a vehicle (not shown). The axle 18 is provided with a groove 20 which is adapted to lock against a plurality of balls mounted in the hub as will hereinafter appear.

Figure 2:
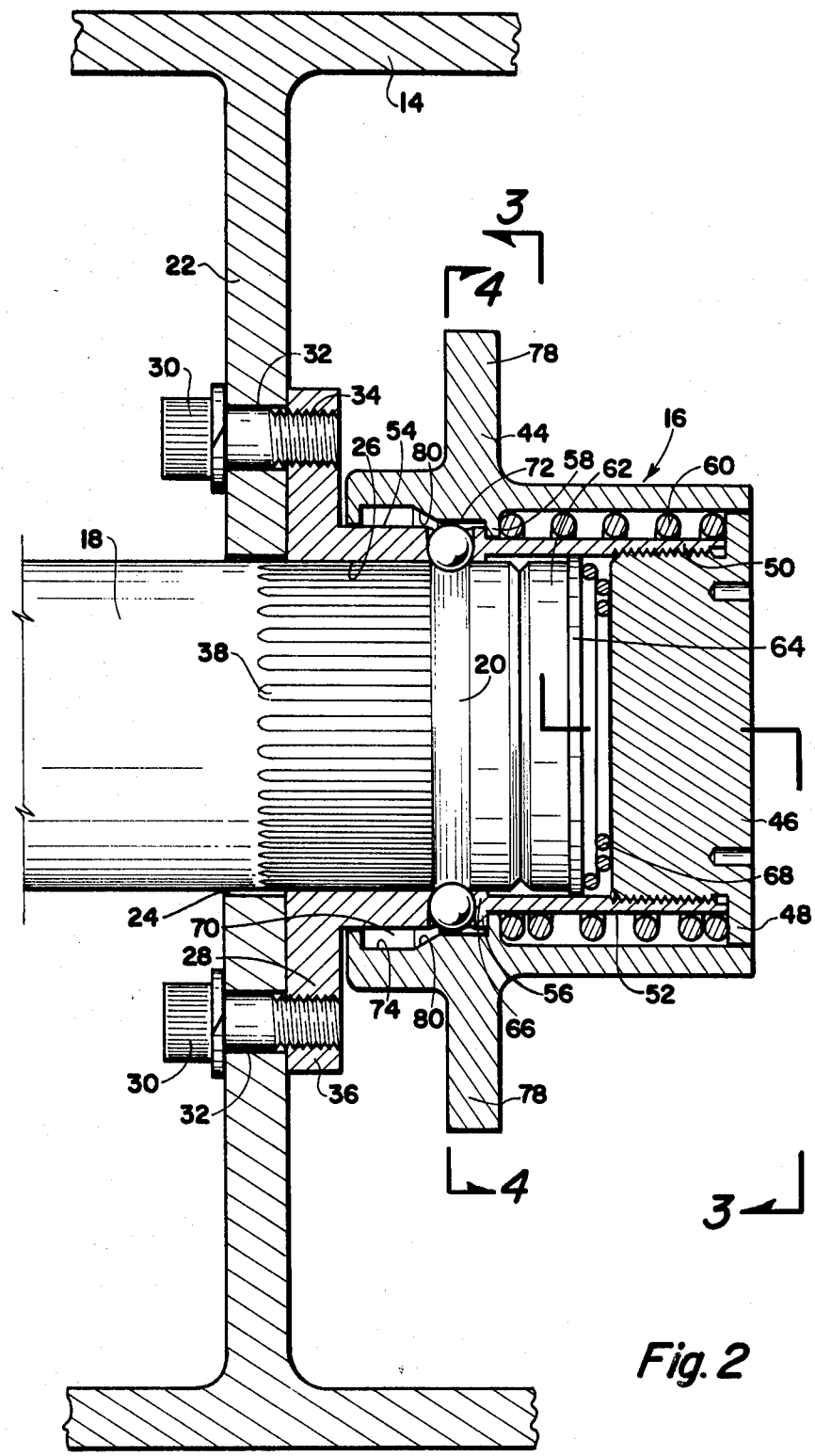
FIG. 2 is a diametral cross-sectional view through the quick release device and a portion of the wheel structure, showing the end of the axle in locked position.
Figure 3:
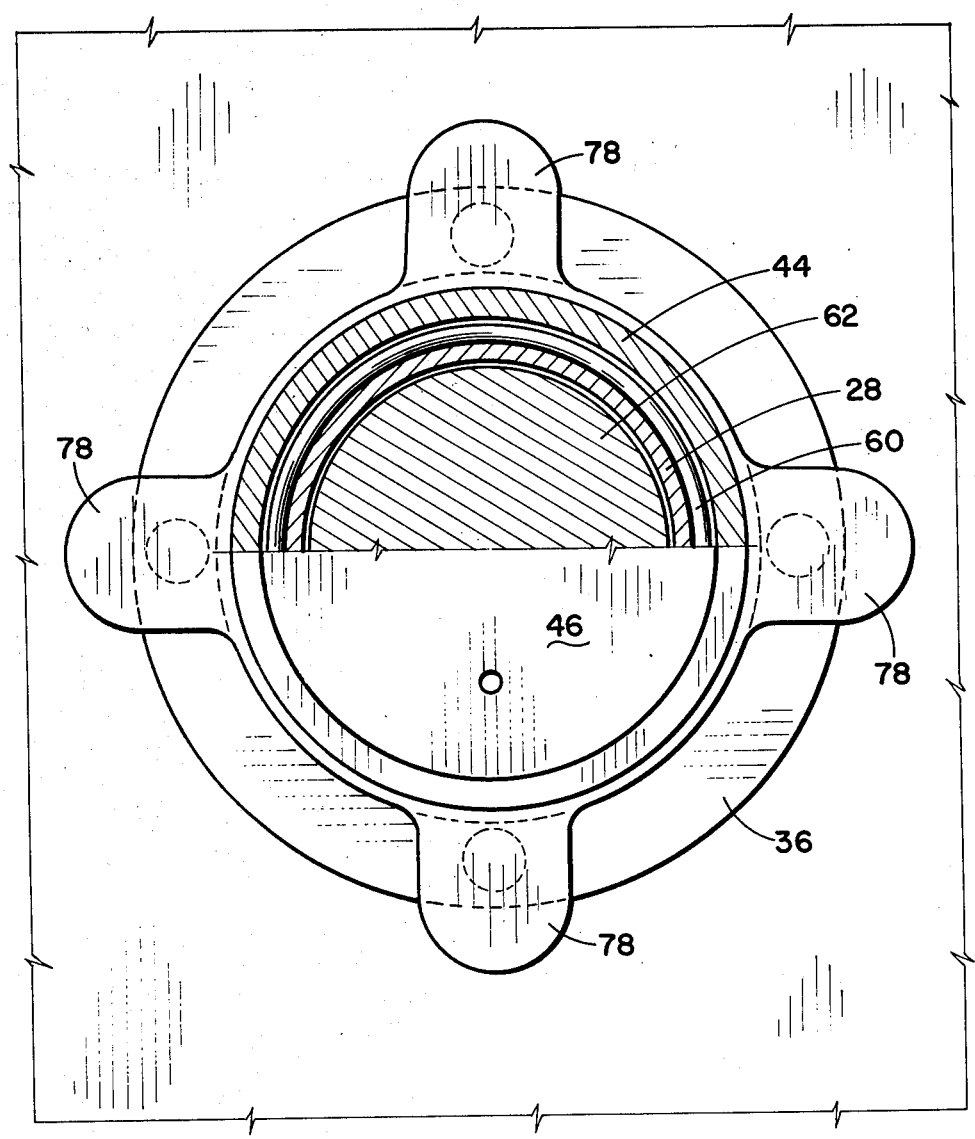
FIG. 3 is an end view, partly in section, taken along section line 3—3 of FIG. 2.
Figure 6:
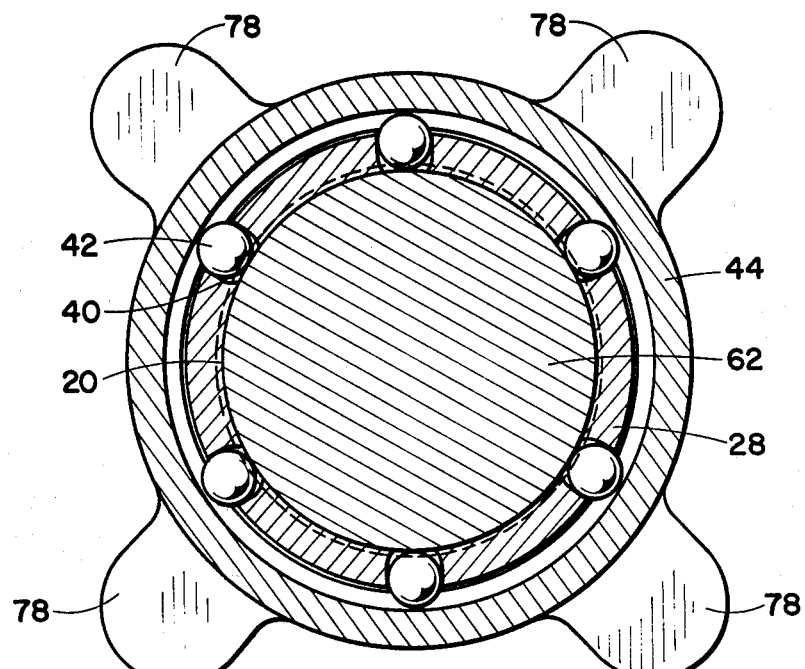
FIG. 6 is a sectional view similar to FIG. 4 but taken along section line 6—6 of FIG. 5.

Referring now to FIG. 2 which shows the axle 18 in its locked position relative to the hub 16, the details of the foregoing connection will now be described. Rim 14 (the outer bead-engaging portions of which are not shown in this Figure) connects with a flat central portion 22 on which the hub 16 is mounted. The flat portion, or web, 22 is provided with a central opening 24 which is in alignment with a central splined opening 26 in a bushing 28. The bushing is attached to the web 22 by means of a plurality of circumferentially spaced bolts 30 which extend through suitable holes 32 in the web 22 and which are threadedly received in circumferentially spaced threaded holes 34 in a flange portion of the bushing 28. In addition to the groove 20, which was previously described, the outer end of the axle 18 is provided with splines 38 which register with the splined opening 26 in the bushing 28.

Figure 4:
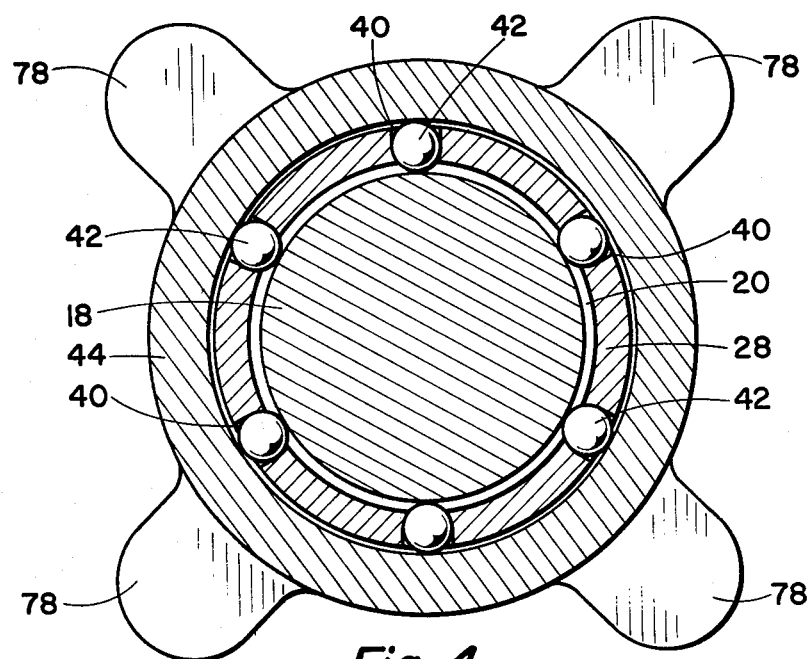
FIG. 4 is a cross-sectional detailed view taken along section line 4—4 of FIG. 2.

Referring now to FIGS. 2 and 4 together, the bushing 28 is provided with a plurality of circumferentially spaced radial openings 40 in which are received a plurality of balls 42. The radially innermost ends of the holes 40 are preferably of lesser diameter than the diameter of the balls 42 to prevent the balls from passing inwardly into the interior of the bushing. As shown in FIG. 4, the balls 42 are received in the groove 20 of the axle 18. A sleeve 44 is mounted on the bushing 28 and cooperates with the bushing to hold the balls in the position shown in FIG. 4.

An end cap 46 having a circumferential flange 48 is threadedly received in the outer threaded end 50 of the bushing 28. This same end of the bushing 28 is provided with an outer surface 52 of lesser diameter than the left hand portion 54 in which the holes 40 are located. The two surfaces 52 and 54 connect through a shoulder 56. The sleeve 44 is provided with an inwardly directed flange 58 which rides over the surface 52 between the flange 48 on the cap 46 and the shoulder 56 on the bushing 28. A helical or coiled spring 60 is received in the annular space between the bushing 28 and the sleeve 44 and also between the flanges 48 and 58. The spring 60, therefore, normally urges the sleeve 44 towards the left as the respective elements are shown in FIG. 2.

Figure 5:
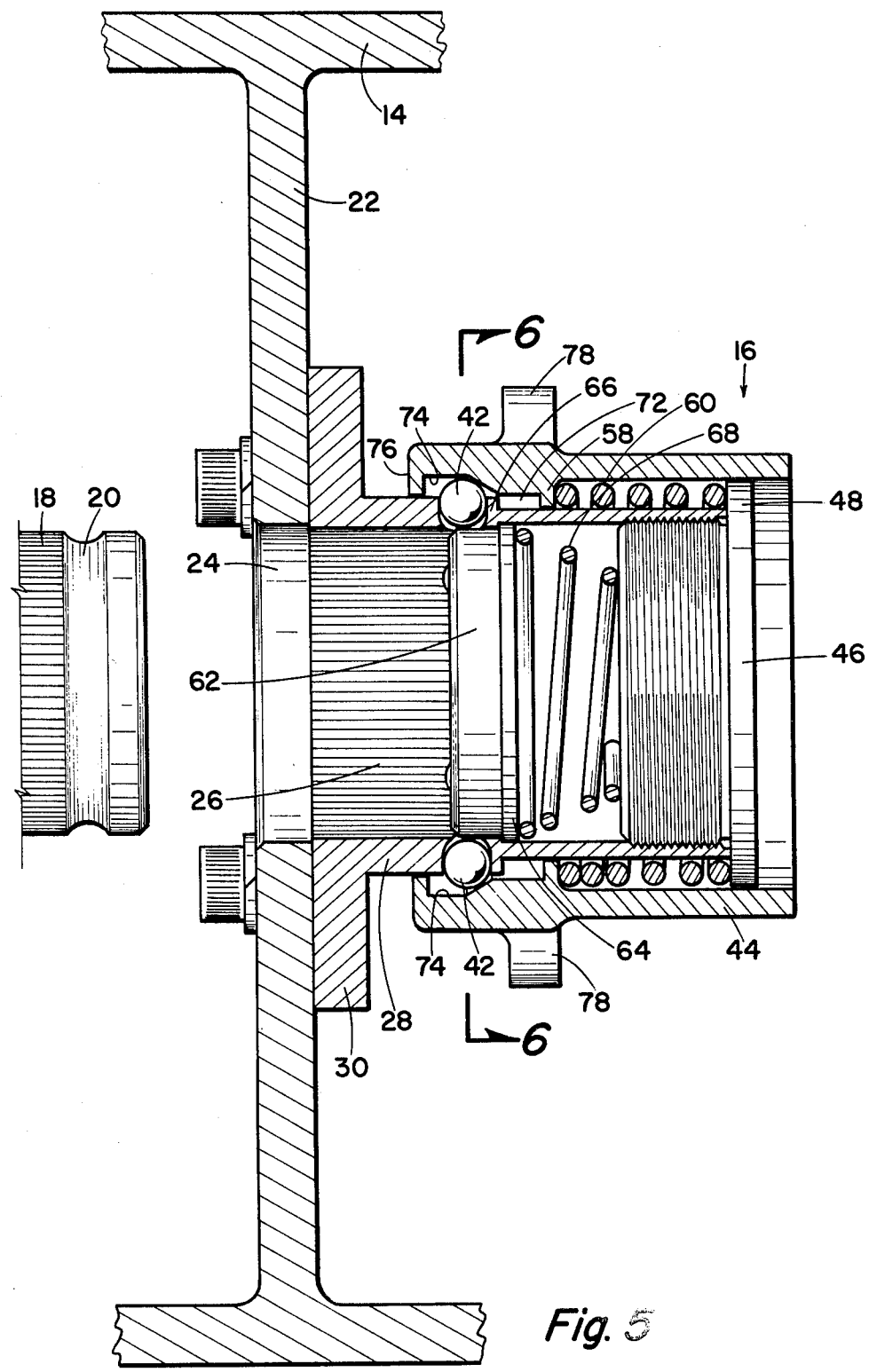
FIG. 5 is a view similar to FIG. 2 showing the wheel and axle in a separated condition.

A plunger 62 having a chamfered edge at its left hand edge is mounted in the space between the left hand end of the cap 46 and the right hand end of the axle 18. The right hand end of the plunger 62 is provided with a circumferential flange 64 which will come against a left hand stop 66 located on the interior opening of the bushing in which the cap 46 is received. A second spring 68 is located between the plunger 64 and the end cap 46 to urge the plunger 62 towards the left for a purpose which will hereinafter appear. The interior left hand portion of the sleeve 44 is provided with a chamber 70 which is defined by a right hand flat cylindrical portion 72 which correctly overlies the balls in the FIG. 2 position; this chamber 70 is provided with a ball receiving recess 74 to the left and of slightly larger diameter than the surface 72. When the elements reach the relative position shown in FIG. 5, the balls are urged into the recess 74 by means of the plunger 62, as best shown in FIG. 5. The extreme left hand portion of the sleeve 44 is provided with a radially inwardly directed lip 76 which essentially keeps dirt from going into the space between the sleeve and the bushing. This lip 76 can be curved at the inner edge or can be provided with spaced openings for purposes of assembly of the device. For the purposes of moving or operating the sleeve 44, four radial lugs or handles 78 are provided.

Figure 7:
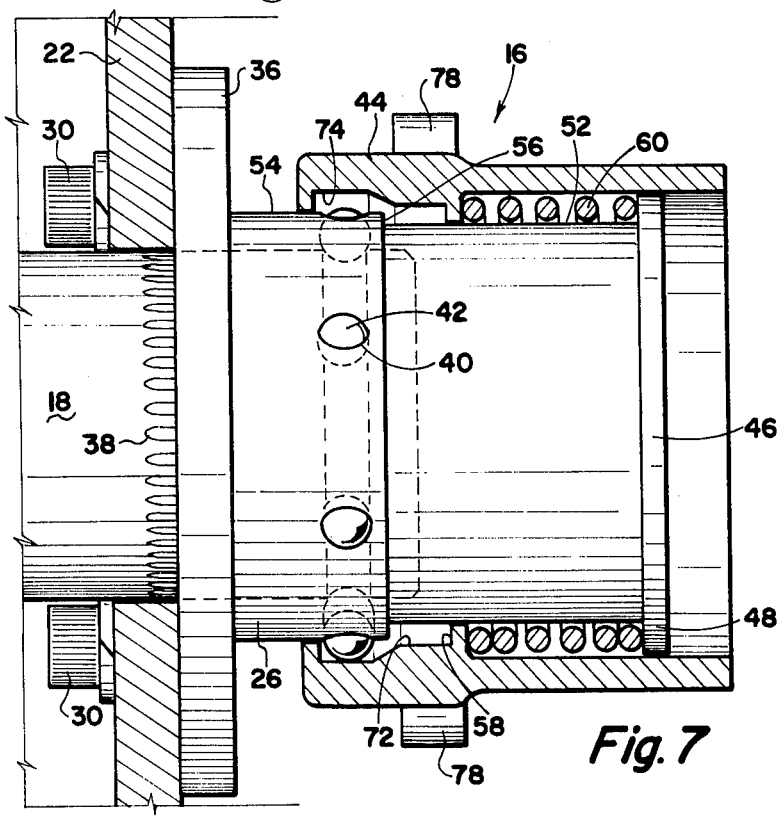
FIG. 7 is a view similar to FIGS. 2 and 5 but showing the wheel in a ready to remove condition.

Starting from the position shown in FIG. 2, which shows the hub 16 (and hence the wheel itself) located on the axle 18, if it were desired to remove the hub from the axle, one merely need pull towards the right on the handles 78; this will move the elements to the relative positions shown in FIG. 7. The entire sleeve 44 has moved towards the right, compressing the spring 60. The flat cylindrical surface 72 is no longer opposite the balls 42, but the balls are now opposite the recess 74; in fact, the lowermost balls can drop into this recess 74. At this point, continued pulling of the handles 78 towards the right will cause the entire assembly including the bushing 24, the web 22, the rim 14, and the wheel 10 to move further towards the right by moving the balls outwardly from the groove 20 as the axle 18 moves relatively towards the left with respect to the remaining assembly. When the wheel has been fully withdrawn from the axle, the plunger 62 will move towards the left under the action of spring 68 until the flange 64 hits against the stop or shoulder 66. At this time, the balls 42 will be in the area of the ball recess 74.

Starting from the position shown in FIG. 5, if it were desired to place the wheel 10 on the axle 18, the axle 18 is aligned with the openings 24 and 26 as shown and the wheel including the hub portion 16 is moved towards the left until the right hand end of the axle 18 comes against the left hand end of the plunger 62. Continued urging of the wheel towards the left will cause movement of the plunger 62 towards the right with a consequent compression of the spring 68. The upper balls 42 will now drop into the upper portion of the groove 20, as shown in FIG. 7. Under the influence of the spring 60, the sleeve 44 will move towards the left until the inclined portion 80 of the chamber 70 which connects the recess 74 with the flat cylindrical portion 72 engages the balls and urges them firmly into the groove 20, thus returning the elements to the relative positions shown in FIG. 2.

Whereas the present invention has been described in particular relation to the drawings attached hereto, it should be understood that other and further modifications, apart from those shown or suggested herein, may be made within the spirit and scope of this invention.

What is claimed is:

1. A quick release coupling for a wheel and axle comprising an axle having an outer end for receiving a wheel thereon, said axle having a circumferential ball receiving groove adjacent to said end, a wheel having a hub with a central opening therein for receiving said end of said axle, a bushing mounted on the hub surrounding said central opening for receiving the end of said axle, means for preventing relative rotational movement of said wheel and said axle when said axle is received in said bushing, said bushing having a plurality of ball receiving holes therein arranged in spaced circumferential relation therearound for overlying said ball receiving groove when said axle is in a locked position relative to said wheel, a plurality of balls received in said ball receiving holes, a locking sleeve slidably and axially mounted on said bushing, a first spring means for urging said sleeve towards said wheel, a plunger centrally mounted within said bushing, a second spring means for urging said plunger against said end of said axle, a stop means for limiting the axial movement of said sleeve towards said wheel, said sleeve having an internal cylindrical surface overlying said balls in said locked position to hold said balls in said ball receiving groove, said sleeve being provided with an internal ball receiving recess of larger diameter than that of said internal cylindrical surface and located inwardly thereof towards said wheel, and handle means on said sleeve for manually pulling said sleeve axially away from said wheel to permit said balls to drop into said ball receiving recess thereby permitting withdrawal of said wheel from said axle, said plunger, after said wheel has been withdrawn from said axle, moving towards said balls and retaining said balls in said ball receiving recess.

2. A quick release coupling as set forth in claim 1 wherein said means for preventing relative rotational movement of said wheel and said axle when said axle is received in said bushing comprises intermating splines on the end of the axle and in the central opening in the bushing.

3. A quick release coupling as set forth in claim 1 wherein said first spring is received in an annular space between the sleeve and the bushing.

4. A quick release coupling as set forth in claim 1 wherein the ball receiving recess connects with the internal cylindrical surface through an inclined surface.

* * * * *